(12) United States Patent
Cheret et al.

(10) Patent No.: US 7,169,206 B2
(45) Date of Patent: Jan. 30, 2007

(54) BATTERY RECYCLING

(75) Inventors: Daniel Cheret, Stabroek (BE); Sven Santen, Hofors (SE)

(73) Assignee: Umicore (BE)

( * ) Notice: Subject to any disclaimer, the term of this patent is extended or adjusted under 35 U.S.C. 154(b) by 0 days.

(21) Appl. No.: 11/108,321

(22) Filed: Apr. 18, 2005

(65) Prior Publication Data

US 2005/0235775 A1  Oct. 27, 2005

Related U.S. Application Data

(60) Provisional application No. 60/563,800, filed on Apr. 21, 2004.

(30) Foreign Application Priority Data

Apr. 19, 2004  (EP) ................... 04076124

(51) Int. Cl.
*C22B 23/06* (2006.01)
(52) U.S. Cl. .................................... 75/10.19
(58) Field of Classification Search ............. 75/425, 75/10.19
See application file for complete search history.

(56) References Cited

U.S. PATENT DOCUMENTS

| | | | |
|---|---|---|---|
| 4,310,350 A * | 1/1982 | Santen ................ | 75/10.19 |
| 4,401,463 A | 8/1983 | Melin et al. | |
| 5,858,061 A * | 1/1999 | Kleinsorgen et al. ....... | 75/711 |
| 6,009,817 A | 1/2000 | Hanulik | |
| 6,228,143 B1 | 5/2001 | Aiken et al. | |
| 6,447,669 B1 | 9/2002 | Lain | |

FOREIGN PATENT DOCUMENTS

| | | |
|---|---|---|
| EP | 1 042 842 | 11/2002 |
| EP | 1 333 522 | 8/2003 |
| JP | 6 346160 | 12/1994 |
| JP | 09-291317 | * 11/1997 |
| JP | 10 158751 | 6/1998 |

OTHER PUBLICATIONS

ASM Specialty Handbook, Nickel, Cobalt and Their Alloys (ASM International), 2000, pp. 345-348 and 3-6).*
"Patent Abstracts of Japan", JP 10 158751, vol. 1998, No. 11 (Sep. 30, 1998).
"Patent Abstracts of Japan", JP 6 346160, vol. 1995, No. 03 (Apr. 28, 1995).

* cited by examiner

*Primary Examiner*—Roy King
*Assistant Examiner*—Kathleen McNelis
(74) *Attorney, Agent, or Firm*—Hutchison Law Group PLLC

(57) ABSTRACT

Process for the recovery of Co or Ni, comprising the steps of:
preparing a metallurgical charge comprising Fe, slag formers, and a useful load containing either one or both of Co and Ni;
feeding the charge to a shaft furnace; and
smelting the charge so as to form a Co or Ni-bearing alloy, an Fe-bearing slag and a gaseous phase,
characterised in that the useful load comprises at least 30 wt. % electrochemical batteries or their scrap, and in that the redox potential in the furnace is chosen so as to slag at least 20 wt. % of the Fe, and at most 20 wt. % of the Co or 20 wt. % of the Ni present in the charge.

11 Claims, No Drawings

BATTERY RECYCLING

This application claims the benefit of U.S. Provisional Application No. 60/563,800, filed Apr. 21, 2004, the content of which is hereby incorporated by reference herein in its entirety.

The present invention relates to a process for the recovery of valuable metals from a charge comprising electrochemical batteries or their scrap, especially a charge comprising mobile phone battery packs. Such batteries are almost exclusively of the Li-ion or Li-polymer Co-bearing type. However, NiMH batteries, which contain appreciable amounts of Ni, are also encountered, either as separate lots or mixed with Co-bearing lots.

In the past, the operation of recycling Co or Ni-based batteries relied on either a multi-step hydro-metallurgical process, or on a two-furnace pyro-metallurgical process.

Hydro-metallurgical processes need a pre-processing installation for shredding the batteries. However, exposure to moist air of even the smallest amounts of metallic Li present in batteries can lead to rapid or even to explosive reactions. To avoid this, shredding is performed under a protective atmosphere or even under liquid nitrogen, thereby reducing the environmental temperature and consequently the reaction rate. Subsequent process steps are dedicated to the separation of all battery constituents, comprising the removal of metallic parts by gravimetric solvent separation. An example of a hydro-metallurgical process can be found in EP-1042842B1 or EP-1333522A1.

Even though the hydro-metallurgical process requires only a moderate investment, it has a major drawback: the operational costs are very high due to the expensive installations required for recycling used waters and solvents. In addition, refining and recycling the separated phases is quite elaborate.

In the pyro-metallurgical process, batteries are generally treated in a process involving two furnaces. The batteries are pyrolised in a first furnace to evaporate the electrolyte and to eliminate the plastic container. If the heat is applied too quickly, the batteries may explode due to the over-pressure caused by the sudden evaporation of electrolyte trapped inside the battery. For this particular reason, batteries cannot be simply thrown in a molten bath. In addition, the furnace has to be equipped with a dedicated and efficient gas-cleaning system to avoid the formation of dioxines and furans due to incomplete burning of plastics in presence of halogens from the electrolyte. After this step, the pyrolised batteries are cooled down and re-melted in a second furnace where they are transformed to metal alloys. An example of a pyro-metallurgical process is given in U.S. Pat. No. 6,009,817.

The major disadvantage of the pyro-process is that this two-furnace process necessitates high investment and operational costs, as two furnaces must be built and operated. Moreover, the energy consumption is very high. The profitability is therefore questionable.

The objective of the present invention is to overcome the problems encountered in both the hydro- and the pyro-processes by using a single-furnace process. This is achieved in a process for the recovery of Co or Ni, comprising the steps of:
   preparing a metallurgical charge comprising Fe, slag formers, and a useful load containing either one or both of Co and Ni;
   feeding the charge to a shaft furnace; and
   smelting the charge so as to form a Co or Ni-bearing alloy, an Fe-bearing slag and a gaseous phase,
characterised in that the useful load comprises at least 30 wt. % electrochemical batteries or their scrap, and in that the redox potential in the furnace is chosen so as to slag at least 20 wt. % of the Fe, and at most 20 wt. % of the Co or 20 wt. % of the Ni present in the charge. Preferably the useful load comprises at least 50 wt. % electrochemical batteries or their scrap.

By scrapped batteries are meant discarded or end-of-life batteries, battery packs or battery products, without regard to their electrical or mechanical integrity.

In one embodiment, the process further comprises the steps of choosing slag-formers so as to produce a final slag composition with an $SiO_2$ to CaO ratio of at least 1, and preferably at least 1.5. The upper limit is determined by practical considerations such as the melting point and the viscosity of the slag.

Furthermore, at least one plasma torch can provide energy to the upper part of the shaft furnace in an amount sufficient to avoid condensation of the gaseous phase. The gaseous phase can also undergo a post-combustion step using at least one plasma torch as energy source.

The process preferentially further comprises the steps of separating and refining Co and Ni from the alloy, whereby preferably at least 90 wt. % of anyone or both of these metals as present in the charge are recovered.

In another embodiment of the process, a zn-bearing material is added to the charge, preferentially in the form of alkaline primary batteries.

With this invention, the disadvantages of the hydro-process are avoided: there is neither need for a costly and hazardous pre-processing installation, nor for a costly solvent or water cleaning operation. The limitations of pyro-processes are also removed: the cost effectiveness of the invented process is drastically increased by the elimination of the need to operate two furnaces instead of one.

In the process, electrochemical batteries containing valuable metals are fed in a vertical shaft furnace together with small amounts of coke, slag formers and eventually metal oxide containing materials. At the bottom of the shaft furnace air, which is preferably oxygen enriched, is injected. The shaft can be divided into three main zones: on top the preheating zone, followed by the plastic pyrolising zone and at the bottom the metal smelting and reducing zone.

In the preheating zone, the temperature of the batteries is slowly increased by rising countercurrent gas generated in the smelting and reducing zone. In this preheating zone, where the temperature of the charge stays under 300° C., the electrolyte is slowly evaporated. The slow temperature increase encountered by the batteries lowers the risk of explosions to a minimum. This is of particular importance, as the proportion of batteries present in the useful load reaches a level of 30 wt. %, or preferably 50 wt. %. Such high levels are needed indeed to ensure that the concentrations of Co and/or Ni in the produced alloy are sufficient to render the process economically viable. The sum of the Co and Ni concentrations in the alloy should preferably be 35 wt. % or higher.

In the second zone—the plastics pyrolising zone—the temperature rises up to 700° C. This is sufficient to melt the plastics from the battery packs. In addition, smelting of plastics generates energy that is used to increase the gas temperature, before the gases rise into the preheating zone.

Finally, in the smelting and reducing zone, a regulated flow of preheated air or even oxygen-enriched air is injected via tuyeres at the bottom of the shaft furnace. The metallic material is transformed into a slag containing Al, Si, Ca and at least some Fe, and into an alloy containing, besides residual Fe, mainly Cu, Co and Ni. These two phases are then continuously or regularly tapped at a temperature between 1200 and 1450° C., preferably in granulated form.

It has thus been found possible to exploit the slightly higher propensity of Fe, compared to Co and Ni, to oxidise and to migrate to the slag phase. The recovery in an alloy of at least 80% of Co and/or Ni, combined with the concentration of these metals by slagging at least 20 wt. % of Fe, are crucial to the economy of the process. Selectivity is however only obtained if a proper redox potential ($pO_2$) is maintained in the furnace. Unfortunately, the $pO_2$ cannot be measured directly: one has to resort to the analysis of the produced phases and adapt the amounts of reducing agents such as cokes or metallic compounds such as Al or Zn in the feed, and the amounts of oxidising agents such as metal oxides or air blown through the tuyeres. The man of the art knows how to interpret the phase analysis and act so as to optimise the redox potential. Moreover, the use of the indicated $SiO_2$-rich slag is helpful, as it readily captures high amounts of FeO.

Gases reach the top of the furnace at a temperature between 250° C. and 700° C. The temperature must be kept high enough to prevent the condensation of components which evaporated below, in the shaft. This can be achieved by adding energy at the top of the shaft, preferably via a plasma torch.

Gases leaving the shaft are further treated in a post-combustion chamber. Their temperature is increased to above 1150° C. between the outlet of the shaft furnace and the inlet of the post-combustion chamber. This increase can be achieved by the energy supply from a plasma torch. Such a torch provides for an important increase in gas enthalpy with a limited increase in gas volume. At this stage, halogens can be captured by injecting selected products via the plasma torch or directly into the combustion chamber. The most efficient products are Ca- or Na-based products, or ZnO. After the post-combustion chamber, the gases are quickly cooled down to a temperature below 300° C. by injecting water vapour. This avoids the recombination of organic compounds with halogens and the formation of dioxines and furans. A classical gas cleaning installation is used for further treatment.

The main advantage of the present invention consists in the excellent recovery of the different materials contained in the batteries. The elimination of plastics generates heat that is used for preheating the injected gases. The valuable metals Co and Ni are recovered in the alloy and are further separated and refined using known techniques such as liquid-liquid extraction. Nearly quantitative recovery of Co and Ni can thereby be achieved. Furthermore, the slag appears to be environmentally acceptable and can even be upgraded as gravel substitute in concrete.

Typically, the process can treat Co and Ni-based rechargeable batteries, such as can be found in mobile phones: NiMH, Li-ion and Li-polymer batteries. It can be used to treat Li-ion batteries with stainless steel or Al covers. In the latter case, a metal oxide or an intermediate metallurgical product containing metal oxides can be added to introduce supplemental oxygen into the reaction zone to oxidise the metallic Al.

The process is very flexible and can treat various impure charges. In actual practice, batches of Li-ion or NiMH batteries also contain other types of batteries, such as Zn-bearing alkaline primary batteries. These mixed lots can also be treated by the process of the invention. Zn-bearing batteries even have a positive impact and can play an active role in the gas cleaning process: the Zn being evaporated in the shaft furnace is converted into ZnO, which captures halogens in the post-combustion chamber. If the amount of Zn batteries is sufficient in the charge, no other products are required to avoid the formation of dioxin after the post-combustion chamber.

The components in the charge are for the major part in metallic form. If the charge contains a sufficient amount of metallic Al, e.g. from Li-ion batteries with an Al can, the energy produced during the oxidation of Al to $Al_2O_3$ is sufficient to melt all other products. No extra energy is then required and the process becomes self-sustaining.

Typically, a charge containing Li-ion battery packs with stainless steel cans is fed with 4 to 20 wt. % cokes, 5 to 20 wt. % of sand and 5 to 20 w % of limestone. A charge containing Li-ion battery packs, or their scraps, with Al cans is fed together with 4 to 20 wt. % cokes, 100 to 200 wt. % of sand, and 100 to 200 wt. % of limestone. In both cases, sand and limestone can be replaced by the equivalent amounts of a silicon and/or calcium containing slag. By analysing the incoming battery charges the correct amount of slag forming materials can be calculated, in order to obtain less than 25 wt. % of $Al_2O_3$ in the slag and keep the viscosity of the slag low enough.

In order to increase the cost effectiveness of the process, a substantial part of Fe is oxidised selectively so as to transfer it to the slag. The Fe-bearing alloy is thereby depleted in Fe and enriched in other metals—mainly Co and/or Ni—and becomes more valuable. Any Co and/or Ni bearing alloy can be treated in a Co/Ni refinery, but naturally an alloy containing the highest possible amount of valuable metals is preferred.

The invention will now be illustrated in the following examples.

EXAMPLE 1

1200 kg of Li-ion batteries with stainless steel cans are introduced in a shaft furnace together with 200 kg of slag from the steel industry containing typically 40 wt. % CaO, 34 wt. % $SiO_2$ and 11 wt. % $Al_2O_3$, 110 kg of $SiO_2$, 100 kg of limestone and 400 kg of cokes during 455 minutes, corresponding to a feed rate of 319 kg/h.

Preheated air at 500° C. is injected via 3 tuyeres at the bottom of the shaft furnace with a flow of 130 $m^3$/h. The metal bath temperature is 1450° C. and the temperature of the gases at the top of the furnace is 445° C. In the post-combustion chamber, the temperature is maintained at 1100–1150° C. 538 kg of slag and 679 kg of Fe-bearing alloy are formed. Their composition and a material balance of the experiment are given in Table 1.

The environmental stability of the slag was tested on the slag as such and after formation of concrete containing 30 wt. % slag and 10 wt. % cement. The tests were performed according to European norm NEN 7343, whereby the material is broken to a PSD of less than 4 mm and percolated with acidified water. The leachability was assessed according to the VLAREA ("Vlaams reglement voor afvalvoorkoming") norm for non-ferro metallurgical slags. The leachability of both the slag and the slag-containing concrete proved to be well below the limits applicable to products intended for the building industry.

COUNTER-EXAMPLE 1

Maintaining constant all other conditions of Example 1, 280 kg of lime was added to the charge instead of 100 kg.

This changed the $SiO_2/CaO$ ratio in such a way that only 1.2% of the Fe in the charge was found in the slag.

EXAMPLE 2

444 kg of Li-ion polymer batteries are introduced in the shaft furnace together with 400 kg of slag from the Pb industry containing 1.5 wt. % Pb, 26 wt. % Fe, 18 wt. % $SiO_2$, 27 wt. % CaO, 5 wt. % $Al_2O_3$, 400 kg of $SiO_2$, 400 kg of limestone and 400 kg of cokes during 520 minutes, corresponding to a rate of 330 kg/h. Pre-heated air at 500° C. is injected via 3 tuyeres at the bottom of the shaft furnace with a flow of 130 m³/h. The bath temperature is kept at 1450° C. and the temperature of the gases at the top of the furnace is 445° C. In the post combustion chamber, the temperature is maintained at 1100–1150° C. 1145 kg of slag and 170 kg of alloy is obtained. Their composition and a material balance of the experiment are given in Table 2.

COUNTER-EXAMPLE 2

Maintaining constant all other conditions of Example 2, 977 kg of lime was added to the charge instead of 400 kg. This changed the $SiO_2/CaO$ ratio in such a way that only 0.6% of the Fe in the charge was found in the slag.

EXAMPLE 3

240 kg of Li-ion batteries with Al can are introduced in the shaft furnace together with 40 kg of slag from the steel industry containing 40 wt. % CaO, 34 wt. % $SiO_2$ and 11 wt. % $Al_2O_3$, 139 kg of $SiO_2$, 370 kg of limestone, 900 kg of heterogenite and 400 kg of cokes during 520 minutes. Pre-heated air at 500° C. is injected via 3 tuyeres at the bottom of the shaft furnace with a flow of 130 m³/h. The bath temperature is kept at 1450° C. and the temperature of the gases at the top of the furnace is 445° C. In the post combustion chamber, the temperature is maintained at 1100–1150° C. 1170 kg of slag and 276 kg of alloy is formed. Their composition and a material balance of the experiment are given in Table 3.

COUNTER-EXAMPLE 3

Maintaining constant all other conditions of Example 3, 370 kg of lime (CaO) instead of limestone ($CaCO_3$), and 700 kg heterogenite instead of 900 kg was added to the charge. This decreased the $SiO_2/CaO$ ratio in such a way that only 6.9% of the Fe in the charge was found in the slag.

TABLE 1

Material balance and metal recovery per produced phase for Example 1.

| | Feed | | | | | | | | | |
|---|---|---|---|---|---|---|---|---|---|---|
| | Mass | Composition (wt. %) | | | | | | | | |
| Component | (kg) | Cu | Ni | Fe | Al | CaO | $SiO_2$ | $Al_2O_3$ | $Li_2O$ | Co | Others |
| Limestone | 100 | | | | | 60 | | | | | |
| Sand | 110 | | | | | | 100 | | | | |
| Li-ion batteries | 1200 | 7 | 2.5 | 35 | 5.0 | 0 | 0 | | 1 | 14 | 35.5 |
| Slag | 200 | | | 1 | | 38.7 | 34.0 | 11.0 | | 0 | 15.3 |

| | Products | | | | | | | | | |
|---|---|---|---|---|---|---|---|---|---|---|
| | Mass | Composition (wt %) | | | | | | | | |
| Component | (kg) | Cu | Ni | Fe | CaO | $SiO_2$ | $Al_2O_3$ | $Li_2O$ | Co | Others |
| Slag | 679 | 0.9 | 0.0 | 22.1 | 20.2 | 26.2 | 22.8 | 1.8 | 1.5 | 4.5 |
| Alloy | 538 | 14.5 | 5.6 | 50.6 | | | | | 29.4 | |

| | Recovery % | | | | | | | | |
|---|---|---|---|---|---|---|---|---|---|
| Component | Fraction (wt. %) | Cu | Ni | Fe | CaO | $SiO_2$ | $Al_2O_3$ | $Li_2O$ | Co |
| Slag | 44.2 | 7.2 | 1.0 | 35.5 | 100 | 100 | 100 | 100 | 6.0 |
| Alloy | 55.8 | 92.8 | 99.0 | 64.5 | | | | | 94.0 |

TABLE 2

Material balance and metal recovery per produced phase for Example 2.

| | Feed | | | | | | | | | |
|---|---|---|---|---|---|---|---|---|---|---|
| | Mass | Composition (wt. %) | | | | | | | | |
| Component | (kg) | Cu | Ni | Fe | Al | CaO | $SiO_2$ | $Al_2O_3$ | $Li_2O$ | Co | Others |
| Limestone | 400 | | | | | 60 | | | | | |
| Sand | 400 | | | | | | 100 | | | | |

TABLE 2-continued

Material balance and metal recovery per produced phase for Example 2.

| Li-ion batteries | 444 | 14.5 | 1 | 1 | 10 | | | 2.5 | 24 | 47 |
|---|---|---|---|---|---|---|---|---|---|---|
| Slag | 400 | | | 1 | | 38.7 | 34 | 11 | | | 15.3 |

Products

| Component | Mass (kg) | Composition (wt. %) | | | | | | | |
|---|---|---|---|---|---|---|---|---|---|
| | | Cu | Ni | Fe | CaO | $SiO_2$ | $Al_2O_3$ | $Li_2O$ | Co | Others |
| Slag | 1145 | 0.2 | 0.01 | 0.27 | 34.3 | 48.5 | 11.6 | 1.0 | 0.4 | 5.4 |
| Alloy | 170 | 35.7 | 2.5 | 3.7 | | | | | 58.1 | |

Recovery (%)

| Component | Fraction (wt. %) | Cu | Ni | Fe | CaO | $SiO_2$ | $Al_2O_3$ | $Li_2O$ | Co |
|---|---|---|---|---|---|---|---|---|---|
| Slag | 86.7 | 3.1 | 0.9 | 23.7 | 100 | 100 | 100 | 100 | 4.7 |
| Alloy | 13.3 | 96.9 | 99.9 | 76.3 | | | | | 95.3 |

TABLE 3

Material balance and metal recovery per produced phase for Example 3.

Feed

| Component | Mass (kg) | Composition (wt. %) | | | | | | | | |
|---|---|---|---|---|---|---|---|---|---|---|
| | | Cu | Ni | Fe | Al | CaO | $SiO_2$ | $Al_2O_3$ | $Li_2O$ | Co | Others |
| Limestone | 370 | | | | | 60 | | | | | |
| Sand | 139 | | | | | | 100 | | | | |
| Heterogenite | 900 | 3.9 | .5 | 10 | | 0.2 | 32.1 | 10.0 | | 13 | 30.3 |
| Li-ion batteries | 240 | 9 | 1.5 | 1 | 32.0 | | | | 2.5 | 16 | 38 |
| Slag | 40 | | | 1 | | 38.7 | 10.1 | 34 | 11 | | |

Products

| Component | Mass (kg) | Composition (wt. %) | | | | | | | | |
|---|---|---|---|---|---|---|---|---|---|---|
| | | Cu | Ni | Fe | CaO | $SiO_2$ | $Al_2O_3$ | $Li_2O$ | Co | Others |
| Slag | 1170 | 0.2 | 0.01 | 2.99 | 20.4 | 57.5 | 12.8 | 0.5 | 0.4 | 5.2 |
| Alloy | 276 | 19.6 | 1.3 | 24.6 | | | | | 54.5 | |

Recovery (%)

| Component | Fraction (wt. %) | Cu | Ni | Fe | CaO | $SiO_2$ | $Al_2O_3$ | $Li_2O$ | Co |
|---|---|---|---|---|---|---|---|---|---|
| Slag | 80.9 | 4.4 | 2.8 | 34.0 | 100 | 100 | 100 | 100 | 3.2 |
| Alloy | 19.1 | 95.6 | 97.2 | 66.0 | | | | | 96.8 |

The invention claimed is:

1. Process for the recovery of Co and Ni, comprising the steps of:
   preparing a metallurgical charge comprising Fe, slag formers, and a useful load containing either one or both of Co and Ni;
   feeding the charge to a shaft furnace; and
   smelting the charge so as to form a Co or Ni-bearing alloy, an Fe-bearing slag and a gaseous phase,
   wherein the useful load comprises at least 30 wt. % electrochemical batteries or their scrap, and wherein the redox potential in the furnace is chosen so as to slag at least 20 wt. % of the Fe, and at most 20 wt. % of the Co or 20 wt. % of the Ni present in the charge.

2. Process according to claim 1, wherein the slag formers are chosen so as to produce a final slag composition with an $SiO_2$ to CaO ratio of at least 1.

3. Process according to claim 1, wherein at least one plasma torch provides energy to an upper part of the shaft furnace.

4. Process according to claim 1, wherein the gaseous phase undergoes a post-combustion step using at least one plasma torch as energy source.

5. Process according to claim 1, further comprising the steps of separating and refining Co, Ni, or Co and Ni from the alloy.

6. Process according to claim 1, wherein at least 90 wt. % of the Co or Ni present in the charge is recovered.

7. Process according to claim 1, wherein a Zn-bearing material is added to the charge.

8. Process according to claim 7, wherein the Zn-bearing material comprises alkaline primary batteries.

9. Process according to claim 1, wherein the slag formers are chosen so as to produce a final slag composition with an $SiO_2$ to CaO ratio of at least 1.5.

10. Process according to claim 1, wherein the shaft furnace comprises:

a smelting and reducing zone providing rising countercurrent gas;

a preheating zone preheated by the rising countercurrent gas; and a plastic pyrolising zone positioned between the preheating zone and the smelting and reducing zone.

11. Process according to claim 10, wherein the charge is preheated in the preheating zone to a temperature under 300° C. by the rising countercurrent gas from the smelting and reducing zone before smelting the charge.

* * * * *